US012098979B2

(12) United States Patent
Wu et al.

(10) Patent No.: US 12,098,979 B2
(45) Date of Patent: *Sep. 24, 2024

(54) COMMUNICATION INTERFACE DEVICE FOR WIRELESS DOOR CONTROLLERS

(71) Applicant: CornellCookson, LLC, Mountain Top, PA (US)

(72) Inventors: Zhizhuo Wu, Tempe, AZ (US); Xin Cui, Tempe, AZ (US); Ryan Carroll, Phoenix, AZ (US)

(*) Notice: Subject to any disclaimer, the term of this patent is extended or adjusted under 35 U.S.C. 154(b) by 73 days.

This patent is subject to a terminal disclaimer.

(21) Appl. No.: 18/151,646

(22) Filed: Jan. 9, 2023

(65) Prior Publication Data

US 2023/0160785 A1 May 25, 2023

Related U.S. Application Data

(63) Continuation-in-part of application No. 17/029,796, filed on Sep. 23, 2020, now Pat. No. 11,551,497.

(51) Int. Cl.
*G01M 99/00* (2011.01)
*G08C 17/02* (2006.01)
*H04W 4/38* (2018.01)

(52) U.S. Cl.
CPC ......... *G01M 99/005* (2013.01); *G08C 17/02* (2013.01)

(58) Field of Classification Search
None
See application file for complete search history.

(56) References Cited

U.S. PATENT DOCUMENTS

| 11,062,541 | B2 | 7/2021 | Prostko et al. |
| 11,551,497 | B2 * | 1/2023 | Wu .......................... H04W 4/38 |
| 2020/0217121 | A1 | 7/2020 | Paulsson et al. |
| 2020/0300026 | A1 | 9/2020 | Lawhon et al. |

* cited by examiner

*Primary Examiner* — K. Wong

(57) ABSTRACT

In example implementations, an apparatus is provided. The apparatus includes a connection interface, a LAN interface, a WAN interface, and a processor. The connection interface is to connect to a PCB of a door controller. The LAN interface is to communicate with a plurality of door sensors. The WAN interface is to communicate with a remote server of a service provider. The processor is communicatively coupled to the connection interface, the LAN interface, and the WAN interface. The processor is to receive door data from the plurality of door sensors via the LAN interface, transmit the door data to the remote server for analysis, receive a correction action from the remote server in response to the door data that is transmitted, and execute the corrective action on a door of the plurality of doors via the LAN interface.

20 Claims, 5 Drawing Sheets

_COMMUNICATION INTERFACE DEVICE FOR WIRELESS DOOR CONTROLLERS_

CROSS-REFERENCE TO RELATED APPLICATIONS

This application is a continuation-in-part of U.S. patent application Ser. No. 17/029,796 filed on Sep. 23, 2020, which is hereby incorporated by reference in its entirety.

BACKGROUND

Commercial buildings, such as warehouses or manufacturing facilities, may have many doors. For example, some warehouses may have doors for docks where deliveries are made, where products are loaded onto trucks, for egress and ingress to the building by forklifts or other machinery, and the like.

Operation of these doors may be important for businesses to keep operations running smoothly. Failure of a door can lead to interruptions of work flow or timely order fulfillment. However, manual tracking of door operations can be cumbersome and time consuming.

In addition, many of the doors may be opened by motors that can be controlled remotely. For example, some doors may have complicated wiring and communication interfaces that are installed and configured before operation. Set up of these electrical components can be complicated. Some technicians at the commercial buildings may not be able to correctly configure these electronic components or may be unable to precisely articulate the errors when troubleshooting with the manufacturer of the electronic components.

DETAILED DESCRIPTION

Examples described herein provide examples of a communication interface device for wireless door controllers and a method of operating the same. As discussed above, some commercial buildings may have many doors. The doors may be rolling doors that can be controlled by a motor. The motor can be controlled by wireless controls that may have complicated wiring and communications interfaces.

Installing new electronic components to control the motor may include many steps where errors may occur and need to be resolved by transferring data from the motor location to a secondary location. For example, currently, a door sensor manufacturer may ship a universal serial bus (USB) driver to a party trying to resolve the error. That person may drive to a job site (e.g., a warehouse) and upload the error code information to the USB. The USB is shipped back to the manufacturer for review. The error code and related data are uploaded from the USB, and offline diagnosis is performed to determine root cause or corrective actions. The solution to the error is saved to the USB, and the USB is shipped back to the person resolving the error at the motor location. This person takes the USB to the job site to download the solution to the door sensor. This person can then ship the USB back to the manufacturer.

In contrast, the present disclosure provides a communication interface device for wireless door controllers that can include a local area network (LAN) interface and a wide area network (WAN) interface. The LAN interface may communicate with wireless door sensors, as well as any other sensors, at the job site or warehouse where such errors may occur. The WAN interface may communicate with the Internet and a remotely located server of the manufacturer. The communication interface device may collect various data from the door sensors and transmit the data to the remotely located server. The remotely located server may analyze the data and generate a corrective action based on the data. The corrective action can be transmitted back to the door sensor via the communication interface device.

In addition, the communication interface device may allow a manufacturer or service provider to track a plurality of different doors. Thus, manually tracking operation of each door may be eliminated. Rather, data may be collected by the communication interface device and organized on a per door sensor format that allows a user to quickly access desired data or operating parameters.

Figure 1:
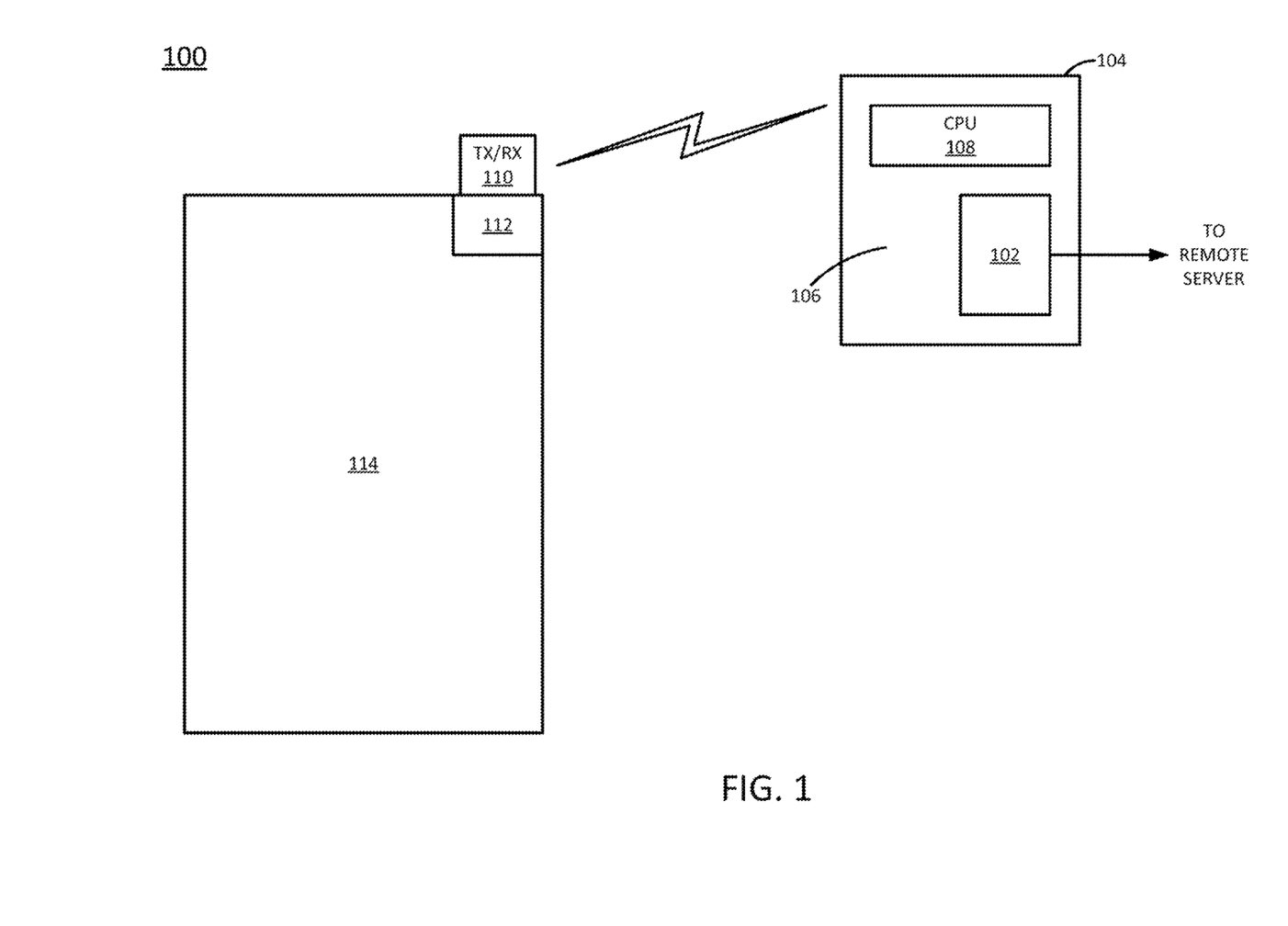
FIG. 1 illustrates an example building with a door and a communication interface device for wireless door controllers of the present disclosure.

FIG. 1 illustrates an example location 100 with a door 114. The location 100 may be a building or a warehouse. Although a single door 114 is illustrated in FIG. 1, it should be noted that the location 100 may include a plurality of doors throughout the location 100.

In one embodiment, the door 114 may be a rolling door. The door 114 may be opened and closed by a motor or operator 112. The operator 112 may be communicatively coupled to a wireless door sensor 110. The wireless door sensor 110 may include a transceiver (Tx/Rx) radio that can transmit data and/or communication signals and receive data and/or communication signals. The transceiver may establish a wireless connection with a controller 104.

In one embodiment, the operator 112 may be controlled remotely by the controller 104. The controller 104 may include a processor 108 that is coupled to a printed circuit board (PCB) 106. The controller 104 may also include a wireless radio (not shown) to communicate with the wireless door sensor 110. The controller 104 may transmit control signals to the operator 112 via the wireless door sensor 110. For example, the controller 104 may send a control signal to the wireless door sensor 110 to activate the operator 112. The operator 112 may open the door 114 from a closed position in response to the control signal, or close the door 114 from an open position.

In one embodiment, a communication interface device 102 of the present disclosure may be communicatively coupled to the printed circuit board (PCB) 106 of the controller 104. For example, the PCB 106 may be modified to include a pin connection or card slot that connects to a corresponding connection interface of the communication interface device 102. In one embodiment, the communication interface device 102 may leverage the processing power of the processor 108 of the controller 104 to execute corrective actions, as described in further details below. In addition, the communication interface device 102 may be powered by the power supply connected to the controller 104.

In one embodiment, the communication interface device 102 may establish a wireless connection with the wireless door sensor 110. The communication interface device 102 may collect door data associated with operation of the door 114 over a local area network (LAN) interface. The communication interface device 102 may then transmit the door data to a remote server, as discussed in further detail below, for analysis. The communication interface device 102 may then receive a corrective action for the door 114 from the remote server in response to the analysis of the door data. The communication interface device 102 may execute the corrective action with the door 114 via the LAN interface.

As noted above, it can be cumbersome to manually collect data, troubleshoot errors associated with the door 114, track performance of the door 114, and the like. The communication interface device 102 may allow door data from a plurality of different doors 114 at the location 100 to be collected. In other words, a single communication interface device 102 may establish a wireless connection to a plurality of different door sensors 110 within range of the LAN interface. The communication interface device 102 may collect door data for each door 114 and transmit the door data to the remote server for analysis. The remote server may then transmit a corrective action for any one of the doors 114 based on analysis of the respective door data.

Figure 2:
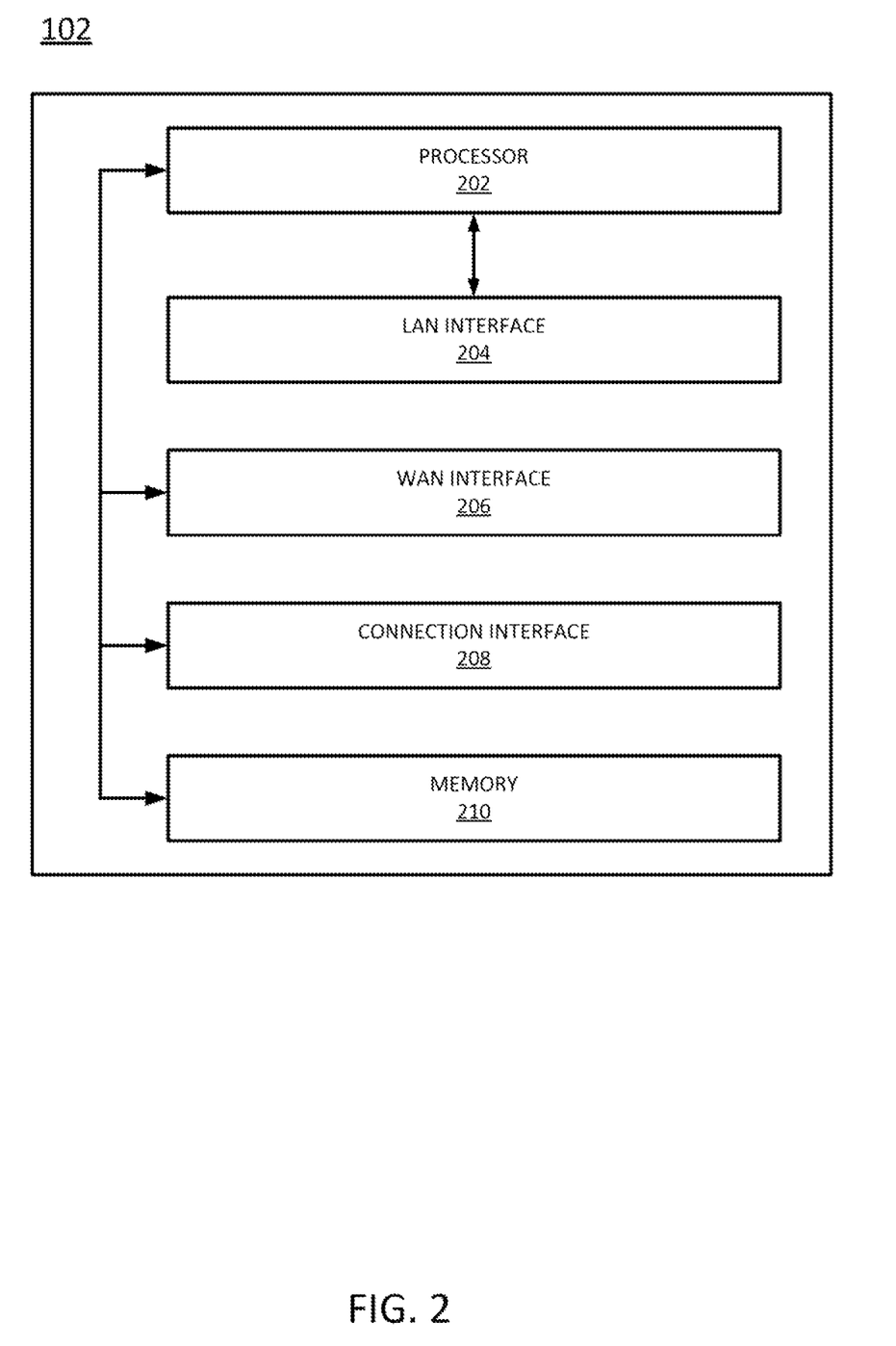
FIG. 2 is a block diagram of an example communication interface device for wireless door controllers of the present disclosure.

FIG. 2 illustrates a block diagram of an example communication interface device 102 for wireless door controllers 104. In one embodiment, the communication interface device 102 may include a processor 202, a LAN interface 204, a WAN interface 206, a connection interface 208, and a memory 210. The processor 202 may be communicatively coupled to the LAN interface 204, the WAN interface 206, the connection interface 208, and the memory 210. Although the LAN interface 204 and the WAN interface 206 are illustrated as separate interfaces, it should be noted that the LAN interface 204 and the WAN interface 206 may be deployed as a single component.

In one embodiment, the LAN interface 204 may include a wireless radio to communicate over a LAN at the location 100. In one embodiment, the LAN may use a Zigbee communication protocol, a low power connection (e.g., Bluetooth), and the like. The LAN interface 204 may be configured to use multiple protocols (e.g., Zigbee and Bluetooth) or a single protocol. Thus, the LAN interface 204 may communicate with any wireless door sensor 110 and/or controller 104 that is within the range of the LAN radio of the LAN interface 204. In one embodiment, more than one communication interface device 102 may be deployed through the location 100 for large areas.

In one embodiment, the WAN interface 206 may include a wireless radio to communicate over a WAN to reach the Internet and a remotely located server of a service provider. In one embodiment, the WAN interface 206 may use a cellular communication protocol such as a long term evolution (LTE) connection, a satellite connection, a wired Ethernet connection, a WiFi connection, and the like. The WAN interface 206 may be configured to use multiple protocols (e.g., LTE, Ethernet, or WiFi) or a single protocol.

In one embodiment, the connection interface 208 may be a pin connection or a card connection that may mate with a corresponding connection on the PCB 106 of the controller 104.

In one embodiment, the memory 210 may be a non-transitory computer readable medium to store door data temporarily before transmission to the remotely located server, or store instructions executed by the processor 202. The memory 210 may be a random access memory (RAM), read only memory (ROM), a solid state drive, and the like.

In one embodiment, the memory 210 may store instructions that when executed by the processor 202, cause the processor 202 to perform certain functions. For example, the instructions may cause the processor 202 to receive door data from the plurality of door sensors 110 via the LAN interface 204, transmit the door data to a remote server for analysis via the WAN interface 206, receive a corrective action from the remote server over the WAN interface 206, and execute the corrective action on a door 114 via the LAN interface 204. In one embodiment, the memory 210 may also store other data, such as firmware for any associated controllers and sensors.

In one embodiment, the memory 210 may also store door data from the plurality of door sensors 110. The door data may then be transferred to the remote server for processing, as discussed in further details below, or processed locally.

In one embodiment, the door data may be used to allow the communication interface device 102 to automatically configure the wireless door sensor 110. For example, the door data may include an identification number or a model number of the door 114. The door data may include any other type of identification information or information associated with how the customer may want the door 114 and/or the wireless door sensor 110 to operate.

The door data may be transmitted to the remote server. The remote server may determine how the wireless door sensor 110 should be configured to operate and/or any software configuration files that should be loaded onto the wireless door sensor 110. The communication interface device 102 may receive the configuration instructions and any software configuration files/applications to be executed from the remote server. The communication interface device 102 may then configure the wireless door sensor 110 and/or cause the wireless door sensor 110 to execute the software configuration files and/or applications to complete an initial set-up or configuration of the wireless door sensor 110.

In one embodiment, the door data may be an error code. For example, error codes may be collected and stored over a period of time (e.g., every hour, every day, once a week, and the like). The error codes may be transmitted to the remote server for analysis. A corrective action may be generated by the remote server to correct the error. For example, the corrective action may be a firmware update, a modification to a software parameter, a change in a communication port, and the like. The corrective action may be received by the communication interface device 102 and executed by the communication interface device 102 over the LAN interface 204. For example, the communication interface device 102 may upload the firmware update to the wireless door sensor 110, change a parameter of the wireless door sensor 110, change a communication port, and the like.

In one embodiment, the door data may be operational data. The operational data may include internal parameters (e.g., encoder values, motor temperature, motor amperage, an open percentage, limit values, and the like), input/output data (e.g., status of various sensors, buttons, relays, interlocks, and the like), or any other type of operational data. The operational data may be transmitted to the remote server for analysis. The remote server may generate a preventative maintenance action to prevent a predicted failure based on the operational data. The communication interface device 102 may receive the preventative maintenance action and perform a corrective action in response. For example, some preventative maintenance may be performed directly by the communication interface device 102 (e.g., software restarts, power cycling the wireless door sensor 110, testing button operation, calibrating sensor values, testing relays, and the like). If the preventative maintenance requires replacement of a door component, the corrective action may include generating a message to a technician, generating an alert on the wireless door sensor 110 (e.g., activating a red LED indicator light), and so forth. In one embodiment, the communication interface device 102 may prevent operation of the door 114 by locking the wireless door sensor 110 until the preventative maintenance is performed.

Figure 3:
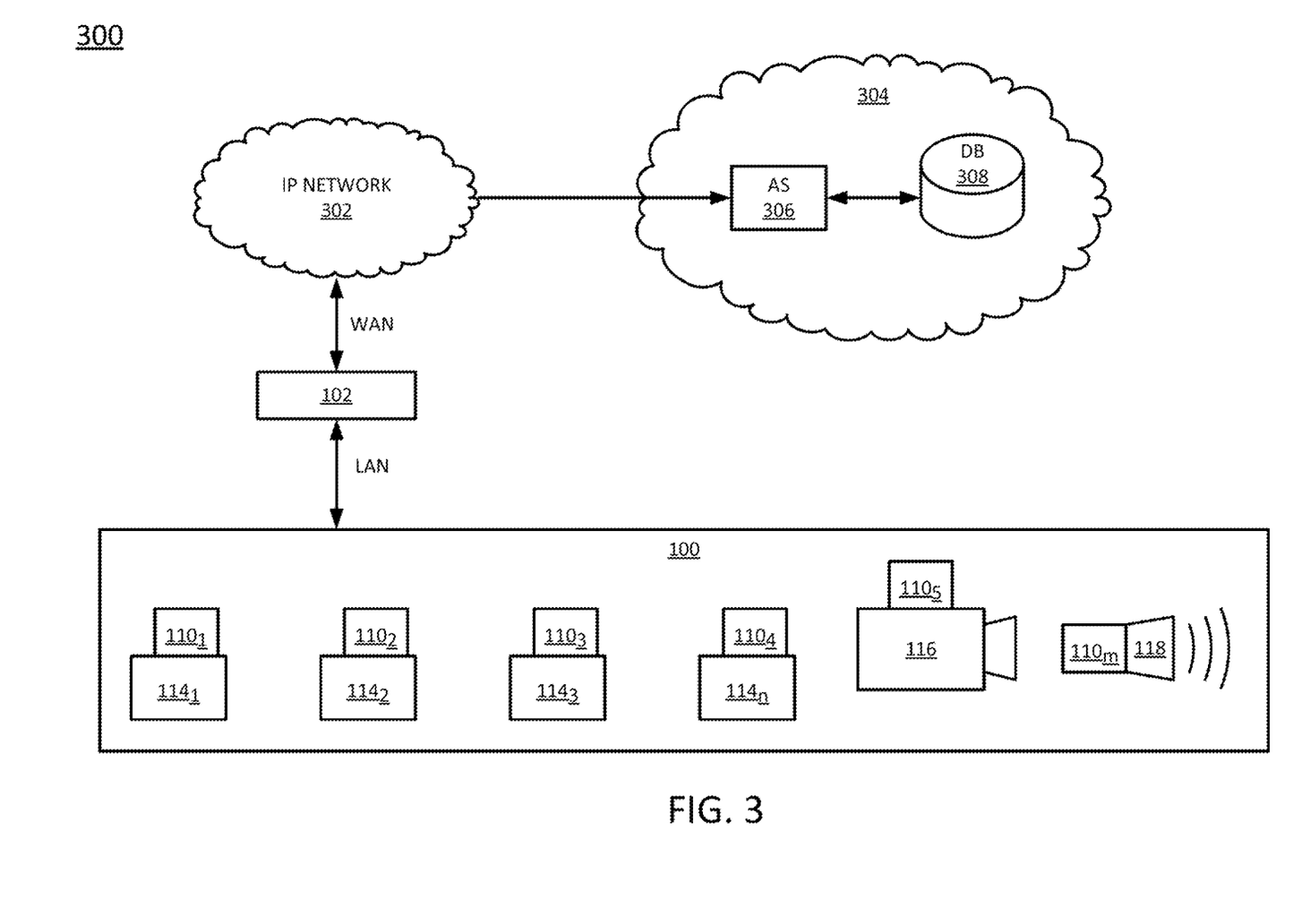
FIG. 3 is a block diagram of an example network between a warehouse and a remote service provider via the communication interface device for wireless door controllers of the present disclosure.

FIG. 3 illustrates a block diagram of an example network 300 of the present disclosure. The network 300 may include the location 100, an Internet protocol (IP) network 302, and a service provider location 304. In one embodiment, the location 100 may include a plurality of doors $114_1$ to $114_n$ (hereinafter individually referred to as a "door 114" or collectively referred to as "doors 114"), as described above and illustrated in FIG. 1. The location 100 may also include a plurality of wireless door sensors $110_1$-$110_m$ (hereinafter individually referred to as a "wireless door sensor 110" or collectively referred to as "wireless door sensors 110"). In one embodiment, each door 114 may include a wireless door sensor $110_1$ to $110_4$. In one embodiment, the wireless door sensors 110 may be used for other remotely monitored or controlled devices at the location 100 other than doors. For example, the location 100 may include a fire alarm 116, a radar sensor 118, and the like. The fire alarm 116 may include a wireless sensor 1105, and the radar sensor 118 may include a wireless sensor $110_m$. The wireless door sensors 110 may collect door data and/or device data from the respective doors 114 or devices 116 and 118 and transmit the data to the communication interface device 102 via the LAN.

The communication interface device 102 may connect to the IP network 302 via the WAN. The IP network 302 may be any type of IP network, such as the Internet, a broadband communication network, and the like. The IP network 302 may include additional network devices that are not shown. For example, the IP network 302 may include gateway, a firewall, routers, switches, one or more access networks, and the like.

The communication interface device 102 may transmit the data collected from the wireless door sensors 110 to an application server (AS) 306 at the service provider location 304. The service provider location 304 may be associated with a manufacturer of the wireless door sensors 110 and the communication interface device 102. The AS 306 may include a processor that is used to analyze the door data that is received from the communication interface device 102 via the IP network 302.

In one embodiment, the service provider location 304 may also include a database (DB) 308 that is communicatively coupled to the AS 306. In one embodiment, the DB 308 may store the door data that is received, track the door data for each door 114 and/or devices 116 and 118, and the like. The AS 306 may analyze the door data to determine corrective actions to generate and transmit to the communication interface device 102 for execution. For example, for installation and configuration of the wireless door sensors 110, the AS 306 may compare the door data (e.g., identification number, model number, and the like) to known configuration parameters stored in the DB 308. The AS 306 may generate a corrective action that includes the correct configuration parameters, software applications, configuration files, and the like, and transmit such a correction action to the communication device 102.

In one embodiment, for error codes, the AS 306 may compare the error code to known error codes stored in the DB 308. The AS 306 may then generate the corrective action (e.g., a firmware update) for the received error code and transmit the corrective action to the communication interface device 102.

In one embodiment, for operational data, the AS 306 may compare the operational data to know patterns and trends associated with potential failures stored in the DB 308. In one embodiment, the AS 306 may apply machine learning to the operational data to make prediction related to potential failures of the doors 114 or devices 116 and 118. The AS 306 may generate a corrective action (e.g., a preventative maintenance action) and transmit the corrective action to the communication interface device 102.

In one embodiment, the AS 306 may analyze door data from all of the doors 114 and the data from the devices 116 and 118 simultaneously. The AS 306 may generate multiple corrective actions in response to the data and transmit the multiple corrective actions to the communication interface device 102. The communication interface device 102 may then execute the corrective actions on multiple doors 114 and/or devices 116 and 118 via the LAN.

In one embodiment, a technician may log into the AS 306 via a computing device (e.g., desktop computer, a laptop computer, a tablet computer, a smart phone, and the like). The technician may analyze the door data for further analysis. For example, the technician may click through event and error logs in the door data to see which service tasks were performed, job sheets that include service dates, what actions were taken, what maintenance was performed, and the like. Thus, the door data may be available for further analysis by a technician on the AS 306 at the service provider location 304 for operation of all of the doors 114 and devices 116 and 118.

In one embodiment, although the AS 306 is illustrated in FIG. 1 as being located remotely from the location 100, it should be noted that the AS 306 may be located within the location 100. For example, the AS 306 may be located within a building at the location 100, but reached via the IP network 302.

In one embodiment, the AS 306 may be within the local area network of the location 100. For example, the service provider location 304 may be co-located at the location 100 to monitor the doors 114. The data from the wireless door sensors 110 may be transmitted to the AS 306 via the LAN at the location 100 rather than being transmitted over the WAN to a remotely located AS 306. For example, the door data may be stored in the memory 210 and transmitted to the AS 306 via the LAN.

In one embodiment, the AS 306 may host a web page that provides a web based user interface. The door data from the wireless door sensors 110 may be uploaded via the web user interface. As noted above, the web page may be accessed via the LAN or WAN depending on whether the AS 306 is located remotely at the service provider location 304 or locally at the location 100.

Thus, the communication interface device 102 of the present disclosure may reduce the complexity associated with installing the wireless door sensors 110 and tracking operational data of all of the doors 114 and devices 116 and 118. The communication interface device 102 may reduce costs by eliminating the need for extra receivers to track door data, perform quick error analysis and corrective actions remotely, upgrade the wireless door sensors 110 automatically, introduce artificial intelligence to the network of devices, and the like.

Figure 4:
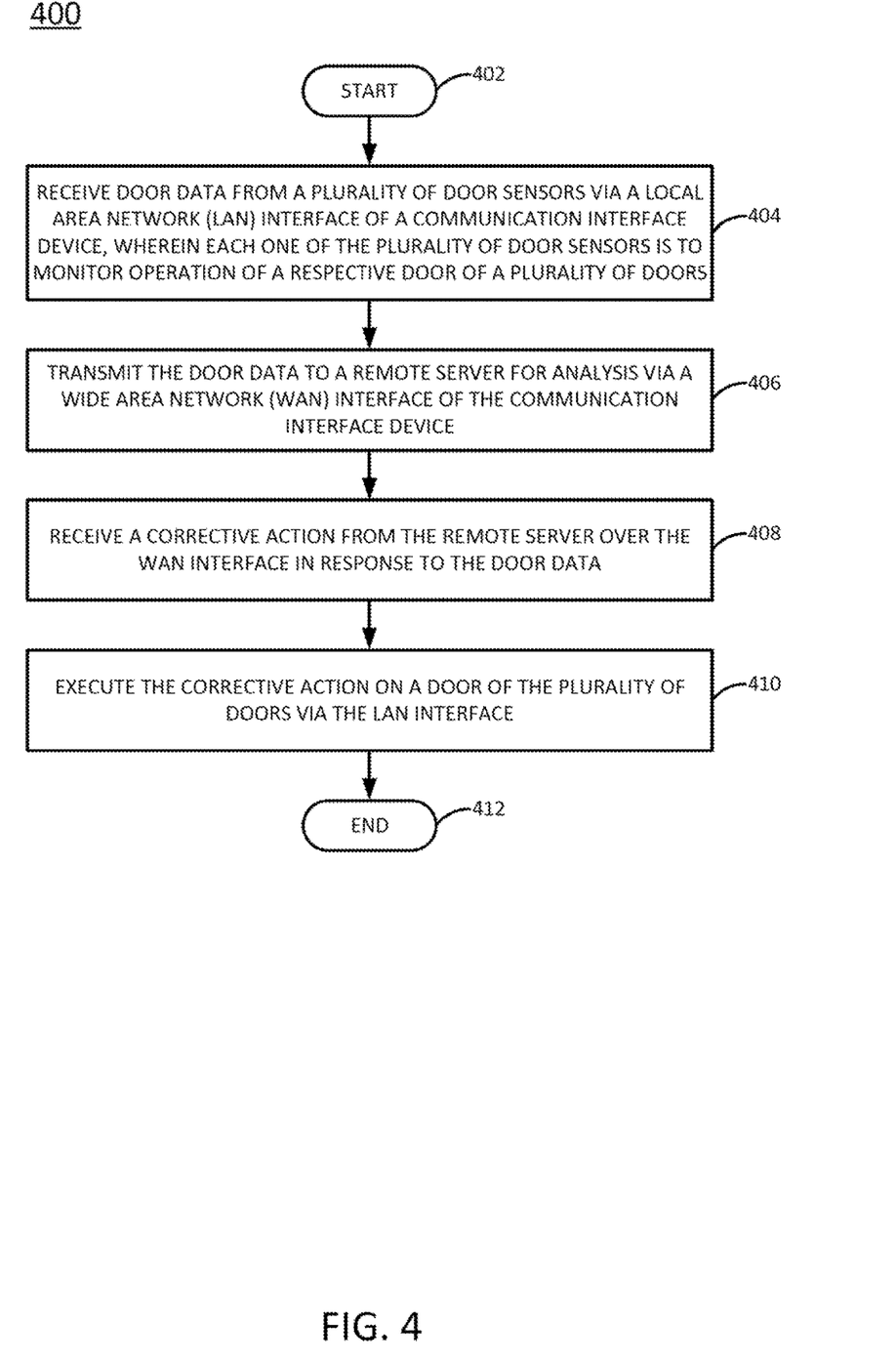
FIG. 4 is a flow chart of an example method to execute a corrective action for a door via a communication interface device for wireless door controllers of the present disclosure.

FIG. 4 illustrates a flow diagram of an example method 400 for executing a corrective action for a door via a communication interface device for wireless door controllers of the present disclosure. In an example, the method 400 may be performed by the communication interface device 102 or the apparatus 500 illustrated in FIG. 5, and described below.

At block 402, the method 400 begins. At block 404, the method 400 receives door data from a plurality of door sensors via the local area network (LAN) interface of a communication interface device, wherein each one of the plurality door sensors is to monitor operation of a respective door of a plurality of doors. For example, the door data may be collected from a door sensor on each one of the plurality of doors. The door data may include identification information for each door sensor so that the communication interface device may organize the door data according to which door sensor provided which data. The door data may be stored locally in memory to be processed locally or transmitted, as discussed below.

In one embodiment, the LAN interface may communicate using a Zigbee communication protocol. The door data may be received from the door sensors that are within wireless communication range of the wireless radios of the LAN interface. In one embodiment, a plurality of communication interface devices may be deployed at a location. The communication interface devices may relay door data to a main communication interface device that is connected to the Internet via a WAN interface, as discussed below. In another embodiment, each communication interface device may transmit door data received within its coverage area to the Internet via respective WAN interfaces. In another embodiment, the door data may be transmitted via the LAN interfaces to a server that is located within the same location where the doors are located. In one embodiment, the door data may be uploaded via web user interface hosted by a server.

In one embodiment, the door data may include door identification information, model number of the door, error codes, operational data, performance data, and the like. The door data may be collected and transmitted periodically (e.g., every 30 minutes, every hour, every 12 hours, every day, every week, and the like).

At block 406, the method 400 transmits the door data to the remote server for analysis. In one embodiment, the door data may be transmitted via the WAN interface. In one embodiment, the WAN interface may communicate using a cellular network connection. The WAN interface may communicate using a cellular network communication protocol, such as a long term evolution (LTE) protocol.

In one embodiment, the door data may be transmitted via the LAN interface. For example, the remote server may be located in a different part of the same building at the location where the doors are located, but connected to the same local wireless network (e.g, WiFi network) connected to the wireless door sensors.

In one embodiment, the remote server may be an application server located at a service provider location or co-located within the same location as the doors (but on another floor or location within the building). The service provider may be a manufacturer of the door sensors and the communication interface device.

At block 408, the method 400 receives a corrective action from the remote server in response to the door data. In one embodiment, the remote server at the service provider location may analyze the door data. Based on the type of door data, the remote server may generate a different corrective action. The corrective action may be transmitted over the WAN interface or the LAN interface.

For example, the door data may be used to initially install the door sensor and configure the door sensor for operation. The door data may include an identification number or a model number of the door. The door data may also include identification information of the door sensor, or any other information used to install the door sensor and configure the door sensor to operate the door. The remote server may determine configuration parameters, configuration files, applications to be executed, and the like. The remote server may transmit the appropriate configuration parameters, files, applications, and the like to the communication interface device. The communication interface device may then execute the changes and/or configuration on the door sensor via the LAN interface in accordance with the corrective action received from the remote server.

In one embodiment, any changes to the configuration parameters, files, applications, and the like, may be performed in parallel. For example, the changes may be stored and validated on the controller while maintaining a copy of the previous configuration parameters, files, and applications. As a result, if any of the changes cause the operation of the door to fail, the door may still operate using the previous configuration parameters, files, and applications.

In another example, the door data may be an error code. For example, error codes may be collected and stored over a period of time (e.g., every hour, every day, once a week, and the like). The error codes may be transmitted to the remote server for analysis. A corrective action may be generated by the remote server to correct the error. For example, the corrective action may be a firmware update, a modification to a software parameter, a change in a communication port, and the like. The corrective action may be received by the communication interface device and executed by the communication interface device over the LAN interface. For example, the communication interface device may upload the firmware update to the door sensor, change a parameter of the door sensor, change a communication port, and the like.

In one embodiment, the door data may be operational data. The operational data may include internal parameters (e.g., encoder values, motor temperature, motor amperage, an open percentage, limit values, and the like), input/output data (e.g., status of various sensors, buttons, relays, interlocks, and the like), or any other type of operational data. The operational data may be transmitted to the remote server for analysis.

In one embodiment, the operational data may be analyzed locally by a processor of the controller or the communication interface device to generate diagnostic information. The diagnostic information may then be transmitted to the remote server to generate a preventative maintenance action. Analyzing the operational data locally may greatly reduce the amount of data that is transmitted.

The remote server may generate a preventative maintenance action to prevent a predicted failure based on the operational data. The communication interface device may receive the preventative maintenance action and perform a corrective action in response. For example, some preventative maintenance may be performed directly by the communication interface device (e.g., software restarts, power cycling the door sensor, testing button operation, calibrating sensor values, testing relays, and the like). If the preventative maintenance requires replacement of a door component, the corrective action may include the generation of a message to a technician, a message to a manufacturer of the door to initiate a service activity for the customer, generating an alert on the door sensor (e.g., activating a red LED indicator light), reducing the speed of the door performance until the maintenance is performed, and so forth. In one embodiment, the communication interface device may prevent operation of the door by locking the door sensor until the preventative maintenance is performed.

At block 410, the method 400 executes the corrective action on a door of the plurality of doors via the LAN interface. For example, the corrective action may execute the corrective action received from the remote server on the door sensor or door via the LAN interface. At block 412, the method 400 ends.

Figure 5:
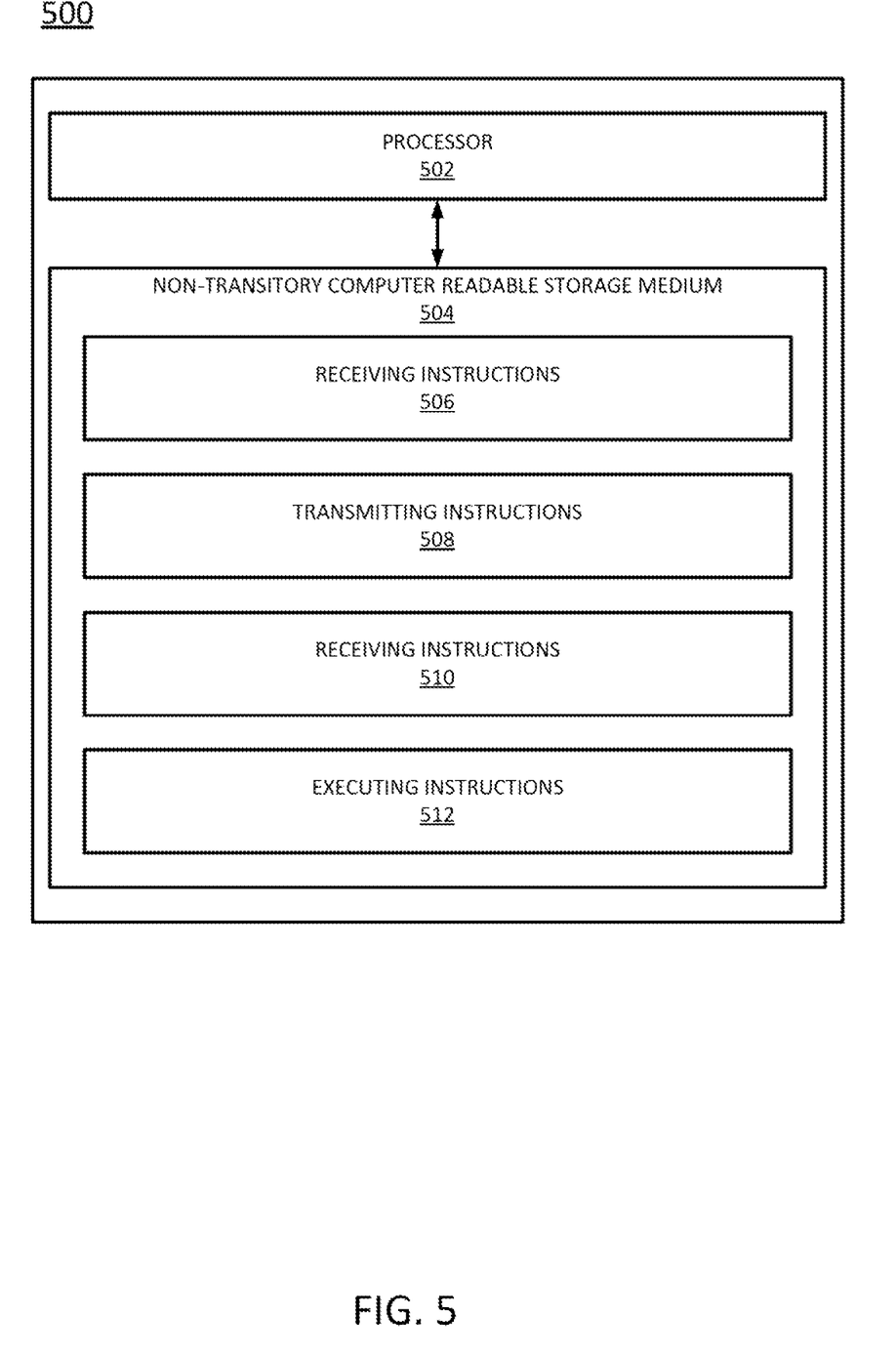
FIG. 5 illustrates an example non-transitory computer readable storage medium storing instructions executed by a processor to execute a corrective action via a communication interface device for wireless door controllers of the present disclosure.

FIG. 5 illustrates an example of an apparatus 500. In an example, the apparatus 500 may be the communication interface device 102. In an example, the apparatus 500 may include a processor 502 and a non-transitory computer readable storage medium 504. The non-transitory computer readable storage medium 504 may include instructions 506, 508, 510, and 512 that, when executed by the processor 502, cause the processor 502 to perform various functions.

In an example, the instructions 506 may include receiving instructions. For example, the instructions 506 may receive door data from a plurality of door sensors via the local area network (LAN) interface of the communication interface device, wherein each one of the plurality door sensors is to monitor operation of a respective door of a plurality of doors.

The instructions 508 may include transmitting instructions. For example, the instructions 508 may transmit the door data to the remote server for analysis.

The instructions 510 may include receiving instructions. For example, the instructions 510 may receive a corrective action from the remote server in response to the door data.

The instructions 512 may include executing instructions. For example, the instructions 512 may execute a corrective action on a door of the plurality of doors via the LAN interface.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

The invention claimed is:

1. An apparatus, comprising:
a connection interface to connect to a printed circuit board (PCB) of a door controller;
a local area network (LAN) interface to communicate with a plurality of door sensors, wherein each one of the plurality door sensors is to monitor operation of a respective door of a plurality of doors; and
a processor communicatively coupled to the connection interface and the LAN interface, wherein the processor is to:
receive door data from the plurality of door sensors via the LAN interface;
transmit the door data to a remote server for analysis;
receive a corrective action from the remote server in response to the door data that is transmitted; and
execute the corrective action on a door of the plurality of doors via the LAN interface.

2. The apparatus of claim 1, wherein the LAN interface communicates via a Zigbee communication protocol.

3. The apparatus of claim 1, further comprising:
a wide area network (WAN) interface, wherein the door data is transmitted to the remote server via the LAN interface or the WAN interface.

4. The apparatus of claim 3, wherein the WAN interface communicates via a cellular communication protocol, an Ethernet connection, a satellite connection, or WiFi connection.

5. The apparatus of claim 3, wherein the remote server is connected to a local wireless network connected to the plurality of door sensors and the door data is transmitted to the remote server via the LAN interface.

6. The apparatus of claim 1, wherein the door data comprises an identification number and a door model.

7. The apparatus of claim 6, wherein the corrective action comprises a configuration application to initialize a door sensor on the door.

8. The apparatus of claim 1, wherein the door data comprises an error code.

9. The apparatus of claim 8, wherein the corrective action comprises a firmware update to correct the error code.

10. The apparatus of claim 1, wherein the door data comprises operational data over a period of time.

11. The apparatus of claim 10, wherein the corrective action comprises a preventative maintenance action to prevent a predicted failure based on the operational data.

12. A non-transitory computer readable storage medium encoded with instructions which, when executed, cause a processor of a communication interface device for wireless door controllers to:
receive door data from a plurality of door sensors via a local area network (LAN) interface of the communication interface device, wherein each one of the plurality door sensors is to monitor operation of a respective door of a plurality of doors;
transmit the door data to a remote server for analysis;
receive a corrective action from the remote server; and
execute the corrective action on a door of the plurality of doors via the LAN interface.

13. The non-transitory computer readable storage medium of claim 10, wherein the LAN interface communicates via a Zigbee communication protocol.

14. The non-transitory computer readable storage medium of claim 10, wherein the door data is transmitted via a web user interface hosted by the remote server.

15. The non-transitory computer readable storage medium of claim 10, wherein the door data comprises an identification number and a door model.

16. The non-transitory computer readable storage medium of claim 15, wherein the corrective action comprises a configuration application to initialize a door sensor on the door.

17. The non-transitory computer readable storage medium of claim 10, wherein the door data comprises an error code.

18. The non-transitory computer readable storage medium of claim 17, wherein the corrective action comprises a firmware update to correct the error code.

19. The non-transitory computer readable storage medium of claim 10, wherein the door data comprises operational data over a period of time, wherein the corrective action comprises a preventative maintenance action to prevent a predicted failure based on the operational data.

20. A method to execute a corrective action for a door via a communication interface device for wireless door sensors, comprising:

receiving, by a processor of the communication interface device, door data from a plurality of door sensors via a local area network (LAN) interface of the communication interface device, wherein each one of the plurality door sensors is to monitor operation of a respective door of a plurality of doors;

transmitting, by the processor, the door data to a remote server for analysis;

receiving, by the processor, a corrective action from the remote server in response to the door data that is transmitted; and executing, by the processor, the corrective action on a door of the plurality of doors via the LAN interface.

* * * * *